Sept. 27, 1955 C. F. TAYLOR 2,718,883
IGNITION SYSTEMS
Filed Nov. 6, 1952 2 Sheets-Sheet 1
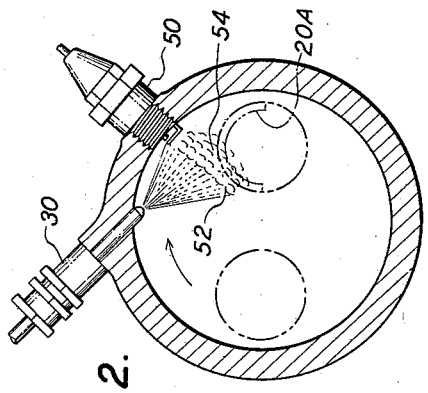
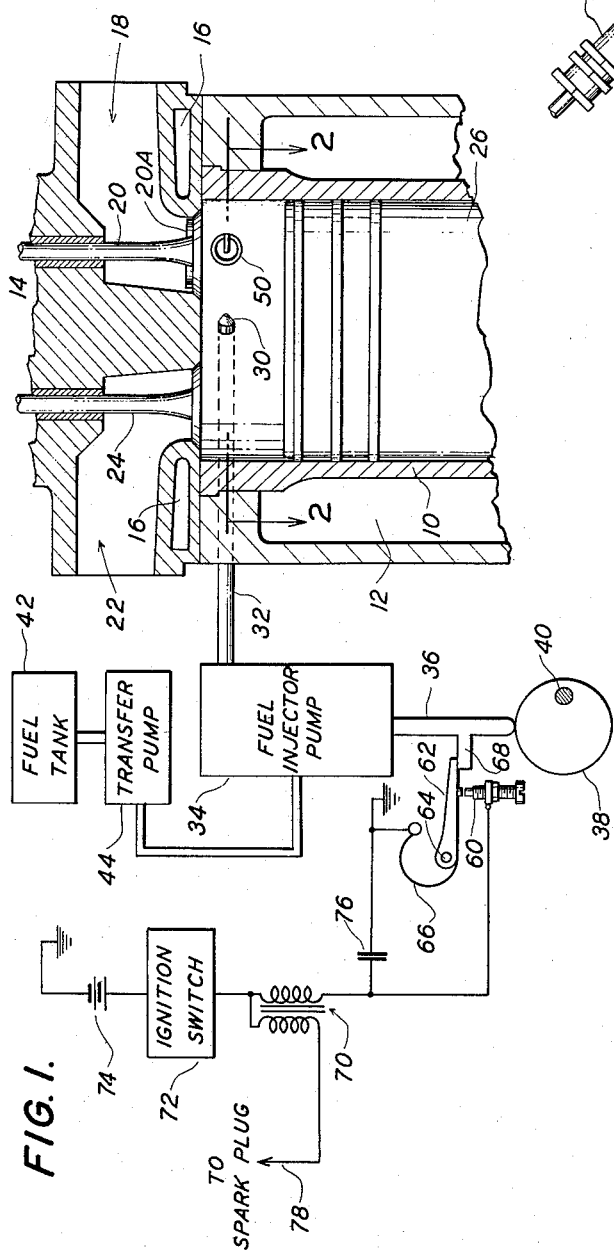
INVENTOR.
CHARLES FAYETTE TAYLOR
BY
*J. H. Grahame*
ATTORNEY

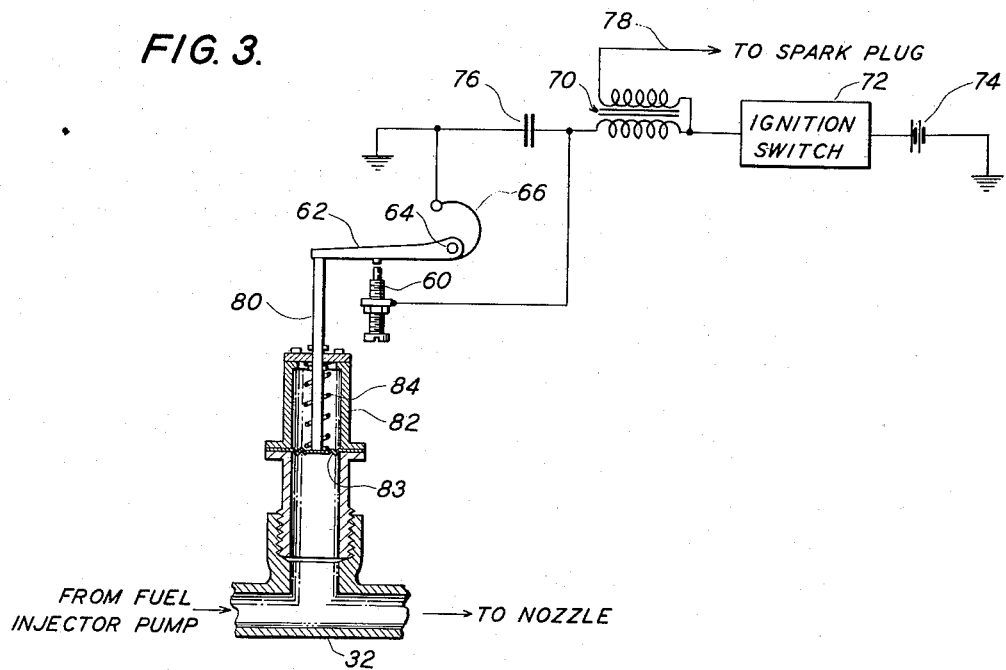
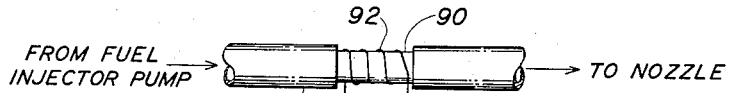

United States Patent Office 2,718,883
Patented Sept. 27, 1955

2,718,883
IGNITION SYSTEMS

Charles Fayette Taylor, Brookline, Mass., assignor to The Texas Company, New York, N. Y., a corporation of Delaware Application November 6, 1952, Serial No. 319,035

6 Claims. (Cl. 123—32)

This invention relates to apparatus for providing spark ignition in internal combustion engines which employ fuel injection systems.

The ignition systems of my invention are particularly useful in engines employing the improved combustion process disclosed in U. S. Patent No. 2,484,009 which was granted to E. M. Barber on October 11, 1949.

In a preferred form of this improved combustion process, the oxidizing gas (say air) is caused to swirl around the cylinder of the engine during the compression stroke at a predetermined rate with respect to the speed of the engine. Fuel to be burned in the engine is injected under pressure during each cycle of operation of the engine. The injected fuel is formed into a patch of combustible mixture which is confined in one direction by the oxidizing gas swirling toward the patch and containing little or no vaporized fuel so that it is incombustible. The patch is confined on the other side by gaseous products of combustion traveling away from a flame front at the edge of the patch where the mixture is burned substantially as fast as it is formed. Combustion is confined to and completed at the leading edge of the patch. Thus, during each cycle of operation of the engine a patch of combustible mixture is progressively formed and consumed in a localized area of the cylinder. As a result, little or no "end gases" are permitted to exist and even when existent are not exposed to the pressure and the temperature for the time required for spontaneous ignition to occur. Consequently "ping" or "knock" is inhibited even with fuels with low anti-knock value at high compression ratios.

In this combustion process, the first increment of the fuel which is injected into the cylinder should be ignited as soon as it mixes with the oxidizing gas to form a combustible mixture. Conventional timing apparatus may be employed; however, the adjustment of the timing of such arrangements is critical. Also, if the engine has more than one cylinder the ignition advance for the individual cylinders is ordinarily the same, and it is not necessarily synchronized with the injection of fuel into the individual cylinders.

In accordance with my invention, the ignition is controlled by means coupled to the fuel injection system and responsive to actuation of the fuel injection system so as to cause the ignition spark to occur at a predetermined time after the injection of fuel is initiated. Thus, the ignition is synchronized with the injection of fuel rather than being synchronized with the movement of the crankshaft of the motor, as in the case in conventional ignition systems. Optimum ignition timing is provided irrespective of the speed of the motor because the timing is controlled by the fuel injection system, rather than by the crankshaft of the engine.

In engines having more than one cylinder, my ignition system may be arranged so that the timing for the respective cylinders is controlled by the fuel injection system for the individual cylinders. Thus the ignition advance for the individual cylinders is synchronized with the injection of fuel into the cylinders so as to achieve optimum operation of the individual cylinders.

The invention is explained with reference to the drawings, in which:

Fig. 1 shows one embodiment of the ignition system employed in an internal combustion engine;

Fig. 2 is a sectional view along line 2—2 of Fig. 1 illustrating the improved combustion process with which this invention is primarily concerned; and Figs. 3 and 4 show two other embodiments of the ignition system.

The engine illustrated in Fig. 1 is a four-cycle engine of the general type described in U. S. Patent No. 2,484,009.

The engine comprises a cylinder 10 provided with a cooling jacket 12, and a head 14 provided with cooling channels 16. An air inlet port 18 in the head opens into the cylinder through a poppet valve 20 which is provided with a semicircular shroud 20A on one side.

The shroud is so placed that it causes the air to swirl rapidly around the axis of the cylinder as it is drawn in on the intake stroke. Various ratios may be employed, but for four-cycle engines of the type here considered a swirl rate of about six times the engine speed in R. P. M. is particularly suitable.

An exhaust port 22 in the head opens from the cylinder through an exhaust valve 24. A conventional piston 26 reciprocates in the cylinder. The piston is also provided with a conventional connecting rod and crankshaft (not shown).

A fuel injector nozzle 30 projects into the upper portion of the cylinder above the top dead center position of the piston and sprays fuel in the form of a fan or cone into the swirling air stream so as to impregnate a segment of the air stream located at one side of a diameter of the cylinder to form a patch of combustible mixture. The spray is directed downstream and across the swirling air stream, and the rate of injection is correlated with the velocity of the swirling air and the density of the air so as to impregnate the air at a controlled fuel-air weight ratio which may be about .04 to .08.

The nozzle is connected by a pipe 32 to a fuel pump 34. The fuel pump is actuated by a stem or plunger 36, and the plunger is moved by a cam 38 which is journaled on a pin 40. The cam is geared to the crankshaft by conventional means (not shown), and it makes one complete revolution for each two revolutions of the crankshaft.

The fuel pump is supplied with fuel from a supply tank 42 which feeds a transfer pump 44.

A spark plug 50 is provided for igniting the combustible mixture within the cylinder. Preferably the spark plug is located about 45° downstream from the injector nozzle 30.

The spark plug is positioned so that it may be employed to ignite the first increment of the combustible mixture as soon as it is formed, and the ignition system is arranged to provide an electric spark between the electrodes of the spark plug so as to effect such ignition. Once the fuel is ignited by the electric spark the flames of the burning fuel ignite the remainder of the fuel which is injected during the combustion period.

If the timing of the ignition system is properly correlated with the injection of the fuel, a flame front 52, which extends approximately radially across the cylinder, is formed during each combustion period. This flame front is located at the front of the patch of combustible mixture, and it serves to burn the mixture substantially as fast as it is formed. The flame front tends to travel in a direction counter to the swirl of the air mass and toward the locus of fuel injection. The combustion products 54 travel in the direction of swirl away from the flame front.

The patch of combustible mixture is thus confined on one side by an incombustible layer of the combustion products swirling away from the patch and on the opposite side by an incombustible layer of air into which no fuel has yet been injected or which does not yet contain enough vaporized fuel to form a combustible mixture. Under these conditions, substantially no "end gases" are formed and even if formed, do not attain a temperature and pressure for a sufficient length of time to result in spontaneous ignition. Consequently "ping" or "knock" is inhibited even with fuels of low anti-knock value at high compression ratios.

I have discovered that it may be preferable to synchronize the ignition system with the action of the fuel injection system, rather than with the movement of the crankshaft of the engine as in conventional timing systems. This insures ignition of the first increment of the fuel which is injected into the cylinder substantially as soon as it mixes with the swirling air mass to form a combustible mixture, irrespective of the overall operation of the engine. In the arrangement shown in Fig. 1 the ignition system is controlled by movement of the control shaft of the fuel injector pump.

A set of breaker contacts 60, 62 is provided for controlling the ignition system. The contact 60 is adjustable, and it is employed to adjust the timing of the ignition system. The contact 62 is pivoted at 64, and it is spring-loaded by spring 66.

A projection 68 on the control shaft 36 of the pump engages one end of the contact 62, so that the contact 62 is caused to move in synchronism with movement of the shaft 36. Thus the breaker contacts are caused to open and close in synchronism with the action of the fuel pump.

The primary winding of a transformer 70, an ignition switch 72, and a battery 74 are connected in series across the breaker contacts. A condenser 76 is connected directly across the breaker contacts, in accordance with conventional ignition techniques.

The transformer 70 is a conventional type having a low voltage primary winding and a secondary winding which provides a high voltage current when the current through the primary winding is interrupted. The output of the secondary winding is connected to the spark plug of the engine by a lead 78.

When the shaft 36 of the fuel pump moves up and down, the projection 68 causes the breaker contacts 60, 62 to open and close. Due to the action of the transformer 70, the battery 74 and the condenser 76, a high voltage current is produced across the electrodes of the spark plug each time that the breaker contacts are caused to open.

In the arrangement shown in Fig. 3, the breaker contacts are actuated by a plunger 80. The plunger is located in a cylinder 82 which is coupled to a pipe 32 which interconnects the fuel pump 34 and the nozzle 30. The plunger is attached to a diaphragm 83 which is responsive to the pressure of the fuel in the pipe 32. A compression spring 84 provides a spring load for the plunger and diaphragm.

In this embodiment of the invention, the ignition system is responsive to the pressure of the fuel in the fuel injector system. Each time fuel is injected into the cylinder of the engine, the plunger 80 is caused to move upwardly and this causes the breaker contacts to open. By adjustment of the contact 60, the breaker contacts can be arranged to open at a predetermined time after the fuel injection is initiated.

The embodiment of the invention shown in Fig. 4 is also responsive to the pressure of the fuel in the fuel injection system. The pipe 32 which interconnects the fuel pump 34 and the nozzle 30 is provided with a section 90 having a reduced outer diameter. Several turns of a strain sensitive wire 92 are wound around the reduced section 90. The wire 92 is a type which changes in resistance with changes in strain on the wire. The wire 92 may be bonded throughout its length to the pipe 32, or it may be bonded only at the two ends of the winding.

The wire 92 is connected as one arm of an electrical bridge circuit. Resistors 93, 94 and 95 comprise the other arms of the bridge.

The ignition switch 72 and the battery 74 are connected across two terminals of the bridge circuit, and an inductor 96 is connected across the other two terminals of the bridge circuit. The inductor 96 serves as an electromagnet to attract the movable contact 62 when the inductor is energized from the bridge circuit.

The bridge circuit is normally balanced so that no energy is applied to the inductor 96. However, when pressurized fuel flows through the line 32, a change in resistance of the wire 92 unbalances the bridge and thereby causes current to flow through the inductor 96.

Although the ignition systems of my invention have been described with reference to use with an engine of the general type disclosed in U. S. Patent No. 2,484,009, it will be apparent that the ignition systems may be employed in other types of engines. For example, the invention is equally suitable for use in two-cycle engines employing the improved combustion process disclosed in the aforesaid patent. Also, the ignition system may be employed in substantially any engine which employs a fuel injection system.

I claim:

1. In an internal combustion engine having a system for injecting fuel under pressure into a cylinder of the engine, a spark ignition system comprising a set of breaker contacts, means connected to said contacts for producing a high-voltage current when said contacts are caused to open, and control means, coupled to the fuel injection system, for causing said contacts to open at a predetermined time after the injection of fuel is initiated, said control means being responsive to the pressure of the fuel in said fuel injection system.

2. In an internal combustion engine having a system for injecting pressurized fuel into a cylinder of said engine, and a spark plug for igniting said fuel, an ignition system for igniting the first increment of said fuel substantially as soon as it mixes with oxidizing gas in said cylinder to form a combustible mixture, comprising a set of breaker contacts, means connected between said set of contacts and said spark plug for causing a current to flow across the electrodes of said spark plug when said breaker contacts are caused to open, and control means connected to the fuel injection system for causing said breaker contacts to open a predetermined time after said fuel injection system is actuated, said control means being responsive to pressure changes in the fuel injection system.

3. In an internal combustion engine having means for causing the oxidizing gas to swirl around in a cylinder of said engine during the compression stroke, an injection system for injecting fuel into a segment of the swirling gas located at one side of a diameter of said cylinder during a predetermined portion of the period required for the gas to complete one swirl, and a spark plug located adjacent the locus of fuel injection, an ignition system comprising a set of breaker contacts, means coupled between said contacts and said spark plug for causing an electric current to flow between the electrodes of said spark plug when said contacts are caused to open, and control means joined to said fuel injection system for causing said contacts to open at a substantially fixed time after the injection of fuel is initiated, so that the first increment of said fuel which is injected into said cylinder is ignited as soon as it mixes with said oxidizing gas to form a combustible mixture, said control means being responsive to pressure changes in the fuel injection system.

4. In an internal combustion engine having means for causing the oxidizing gas to swirl around in a cylinder of the engine during the compression stroke, an injection system for injecting fuel into a segment of the swirling gas located at one side of a diameter of the cylinder during a predetermined portion of the period required for the gas to complete one swirl, and a spark plug located adjacent and downstream from the locus of fuel injection, an ignition system comprising a set of breaker contacts, means coupled between the contacts and the spark plug for causing an electric current to flow between the electrodes of the spark plug when the contacts are caused to open, and control means coupled to the fuel injection system and responsive to the pressure of the fuel in the injection system for causing the contacts to open at a predetermined time after the injection of fuel is initiated, so that the first increment of the fuel which is injected into the cylinder is ignited substantially as soon as it mixes with oxidizing gas to form a combustible mixture.

5. The apparatus of claim 4 wherein said control means comprises a movable member which is responsive to the pressure of the fuel in the fuel injection system.

6. The apparatus of claim 4 wherein said control means comprises electric means responsive to the pressure of the fuel in the injection system for providing an electric potential which varies with variations in the pressure of the fuel, and an electromagnet responsive to the output of said electric means for causing the breaker contacts to open when the magnitude of said electric potential exceeds a predetermined value.

References Cited in the file of this patent

UNITED STATES PATENTS

| | | |
|---|---|---|
| 2,215,106 | Lefebvre | Sept. 17, 1940 |
| 2,483,288 | Malin | Sept. 27, 1949 |
| 2,484,009 | Barber | Oct. 11, 1949 |